United States Patent [19]
Gerawan

[11] Patent Number: 5,120,184
[45] Date of Patent: Jun. 9, 1992

[54] METHOD AND APPARATUS FOR TRANSPORTING WORK OBJECTS

[76] Inventor: Daniel J. Gerawan, 6407 S. Engelhart Ave., Reedley, Calif. 93654

[21] Appl. No.: 514,935

[22] Filed: Apr. 26, 1990

[51] Int. Cl.$^5$ .............................................. B60P 1/02
[52] U.S. Cl. .................................... 414/495; 187/17; 254/93 HP
[58] Field of Search ................ 414/495, 786; 254/93 HP; 187/8.71, 8.72, 17, 18; 410/87, 88, 119, 125; 198/955

[56] References Cited

U.S. PATENT DOCUMENTS

| | | | |
|---|---|---|---|
| 3,028,981 | 4/1962 | Ford et al. | 410/117 |
| 3,055,446 | 9/1962 | Vaughen | 180/125 |
| 3,095,987 | 7/1963 | Sable | 410/1 |
| 3,145,853 | 8/1964 | Langenberg | 52/2 A |
| 3,161,150 | 12/1964 | Sable | 410/87 |
| 3,462,027 | 8/1969 | Puckhaber | 410/119 |
| 3,730,366 | 5/1973 | Berends | 414/495 |
| 3,819,076 | 6/1974 | Oehler | 414/495 |
| 4,087,895 | 5/1978 | Etienne | 254/93 HP X |
| 4,116,344 | 9/1978 | Ziemba | 410/119 |
| 4,323,141 | 4/1982 | Ragan et al. | 254/93 HP X |
| 4,353,457 | 10/1982 | Haley | 414/495 X |
| 4,470,578 | 9/1984 | Arvidsson et al. | 254/93 HP X |
| 4,898,509 | 2/1990 | Thunnissen | 414/495 |

FOREIGN PATENT DOCUMENTS

| | | | |
|---|---|---|---|
| 3706387 | 9/1988 | Fed. Rep. of Germany | 254/93 HP |
| 719949 | 3/1980 | U.S.S.R. | 198/955 |

*Primary Examiner*—David A. Bucci
*Attorney, Agent, or Firm*—Worrel & Worrel

[57] ABSTRACT

A method and apparatus for transporting a work object including a frame adapted to be mounted on a vehicle having a supporting surface, a platform for receiving the work object in rested relation thereon disposed in overlaying relation to the supporting surface of the vehicle, an inflatable reservoir disposed between the supporting surface and the platform, and a system for selectively inflating the reservoir to move the platform and thus the work object borne thereby to a suspended position cushioned against damage during transport by the vehicle.

13 Claims, 4 Drawing Sheets

METHOD AND APPARATUS FOR TRANSPORTING WORK OBJECTS

BACKGROUND OF THE INVENTION

1. Field of the Invention

The present invention relates to a method and apparatus for transporting work objects and more particularly to such a method and apparatus which are particularly well suited to the transport of perishable goods ordinarily subject to damage during transport such as is attendant to the movement of such goods by truck, railroad, ship and the like.

2. Description of the Prior Art

The movement of goods, particularly in large volume, presents chronic difficulties. For example, the transport of perishable goods to market, and to other sites for further processing, is occasioned by a high incidence of damage, such as bruising, marring, and other more severe damage, commonly resulting in significant losses. These problems are particularly acute in the harvesting and shipment of fresh fruits and vegetables which are typically highly susceptible to damage, particularly at the time of harvest when they must be transported. Such produce is packed in containers such as boxes or bins, depending upon the specific goods involved and the principal market therefor. The containers, once filled with the produce, are loaded on the beds of trailers, railroad cars and the like on pallets to form block like units composed of the containers with the pallets interposed therebetween. Where transported by truck, the block like units are strapped into position on the truck and/or trailer beds and transported along the nation's roadways. The motion and shock attendant to such movement damages the produce in the manner described. The equivalent situation prevails in the case of shipment by railroad, ocean going vessel and the like.

Since much of the damage, such as bruising, does not become visible for rather lengthy periods of time, the goods frequently do not evidence the damage until they reach the retail level of the marketplace. As a consequence, growers, packers, shippers and others at wholesale levels are incapable of removing such damaged goods prior to receipt by the retailer and consumer. This is frequently severely damaging to the market for such goods over time since a resistance to the purchase of the goods develops in the marketplace. In other instances where the damage becomes evident earlier in the flow of goods to the marketplace, entire shipments of the goods may be rejected because of the evident damage. Although considerable efforts have been directed toward the improvement of the cushioning capabilities of the suspension systems of, for example, trailers, including the use of air bags as operable portions of the suspension systems thereof, such efforts have not appreciably reduced these losses.

Other efforts have been directed to the use of various systems for supporting such containers on the bed of the trailer itself in an effort to isolate the goods thereof from damage. For example, the Sable U.S. Pat. No. 3,161,150 is directed to a load receiving, supporting and cushioning apparatus specifically adapted for use on railway cars and the like wherein inflatable cushions are employed to elevate containers for cushioning them during transport. Similarly, the Sable U.S. Pat. No. 3,095,987 relates to a load handling and cushioning device which employs air pressurizable tubes. These and other prior art devices have recognized the potential benefits of the use of inflatable cushions and the like to isolate perishable goods from the motion and shock incident to transport All such prior art devices have, however, proved inadequate for a myriad of reasons and frequently are too complex to be of practical value. In any case, there have heretofore been no devices which have proved to be of practical utility. For example, no such prior art devices have been capable, as a practical matter, of being retrofitted on existing trailer beds, railway cars, truck beds or the like and for this reason, as well as for many others, have not been well received. Such prior art devices have not proved to be compatible with existing handling equipment or procedures employed in the shipment of perishable goods and therefore have been resisted. Furthermore, in industries involved in the transport of such perishable goods, there is frequently a high turnover of personnel so that retraining of personnel constitutes a considerable factor in day to day operation. Since such prior art devices require considerable training in order properly to be operated, they have not been well received. In addition, while the potential benefits of inflated cushioning means have been known, the dependable control of inflatable equipment has not previously been achieved. Thus, such prior art equipment is difficult to operate and control and correspondingly presents a substantial risk of damage to the equipment and to the goods borne thereby as well as to personnel required in their use.

Therefore, it has long been known that it would be desirable to have a method and apparatus for transporting work objects such as perishable fresh fruits and vegetables by truck, railroad, ship and the like employing inflatable mechanisms to isolate the work objects from the motion and shock incident to such transport, operable dependably and securely by personnel to achieve the desired result, and minimizing the risk of equipment failure, damage to the work objects and injury to personnel all in such a manner which insures that the losses characterized by conventional transporting procedures due to such damage is dependably and consistently maintained at a minimum.

SUMMARY OF THE INVENTION

Therefore, it is an object of the present invention to provide an improved method and apparatus for transporting work objects.

Another object is to provide such a method and apparatus which are particularly well suited to the insulation of perishable goods, such as fresh fruits and vegetables, from bruising, marring, and other damage as a consequence of shipment of the goods by truck, railroad, ship or the like.

Another object is to provide such a method and apparatus which employ inflatable reservoirs operating within a controlled environment so that the isolation of the perishable goods from the motion and shock resulting from such transport is substantially complete while movement of the perishable goods to and from a suspended or cushioned condition is dependably controlled.

Another object is to provide such a method and apparatus which can be operated without risk of failure of the apparatus, loss or damage to the perishable goods, or injury to the personnel required for the operation thereof.

Another object is to provide such a method and apparatus which can be operated to adjust the attitude of the perishable goods within the suspended state permitting such suspension to be fine tuned for transport.

Another object is to provide such a method and apparatus which are so designed as to render the improper use thereof substantially unattainable.

Another object is to provide such a method and apparatus which are substantially fully compatible with existing handling equipment and procedures and which can easily be retrofitted on existing trailer beds, truck beds, railway car beds as well as in the holds of ships very easily and dependably and at minimal cost.

Another object is to provide such a method and apparatus which do not require an independent source of energy for the operation thereof and which can be employed with conventional containers, pallets and load securing systems of all types.

Further objects and advantages are to provide improved elements and arrangements thereof in an apparatus for the purpose described which is dependable, economical, durable and fully effective in accomplishing its intended purpose.

These and other objects and advantages are achieved, in the preferred embodiment of the method and apparatus of the present invention, in an apparatus having a frame adapted to be mounted on a means of conveyance having a supporting surface, a platform for receiving the work object in rested relation thereon disposed in overlaying relation to the supporting surface of the means of conveyance, an inflatable reservoir disposed between the supporting surface and the platform and a system for selectively inflating the reservoir to move the platform and thus the work object borne thereby to a suspended position cushioned against damage during transport by the means of conveyance.

DESCRIPTION OF THE PREFERRED EMBODIMENT

Figure 1:
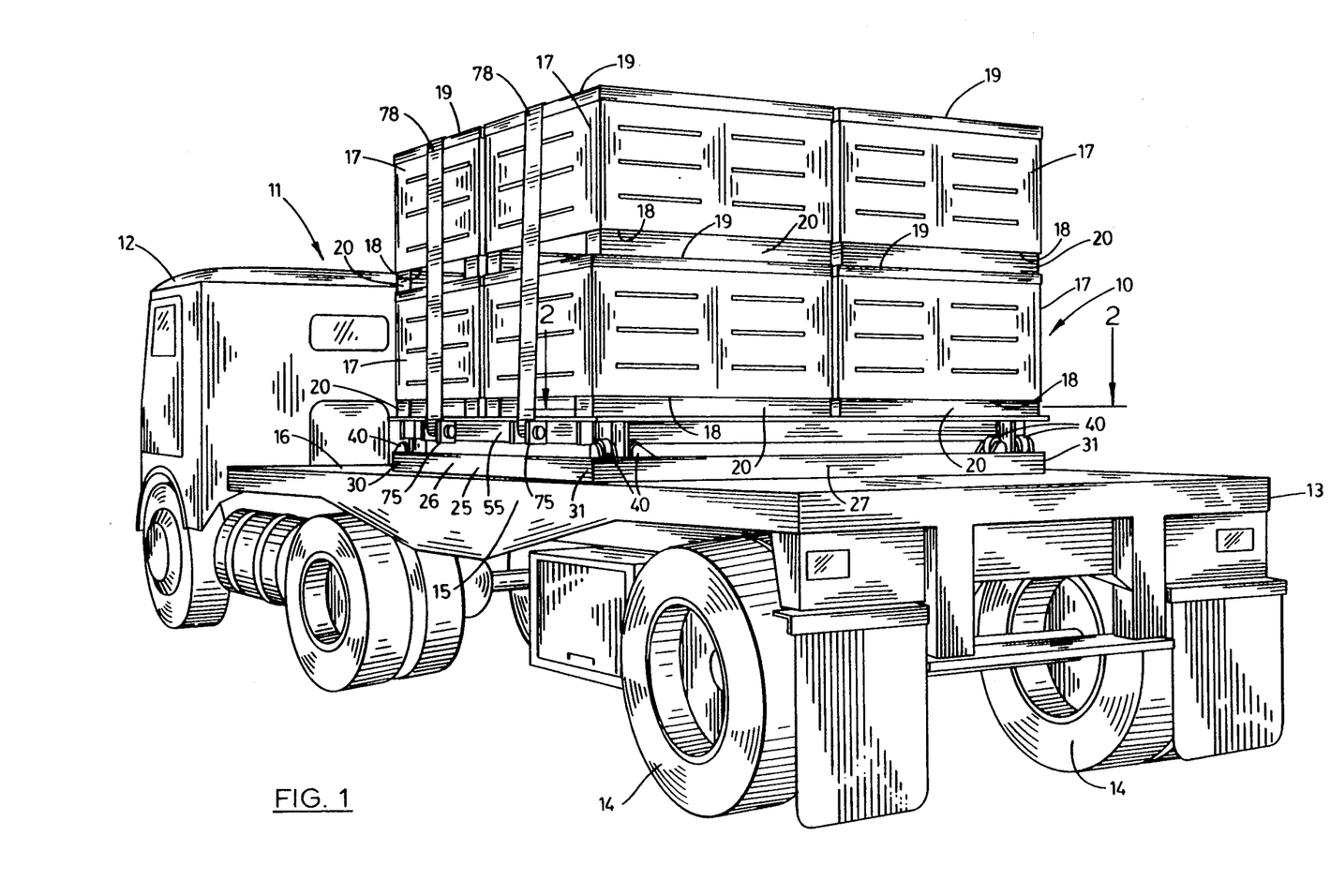
FIG. 1 is a perspective view of the apparatus of the present invention for practicing the method of the present invention shown in a typical operative environment on the trailer of a vehicle.

Referring more particularly to the drawings, the apparatus for transporting work objects of the present invention is generally indicated by numeral 10 in FIG. 1. While the apparatus of the present invention is adapted for use, substantially without any variation whatsoever, on the flat bed trailers of trucks, the flat beds of trucks, railroad cars, in the holds of ships and the like, for illustrative convenience, it is shown herein on a vehicle 11, in this case a tractor or truck 12 operable to pull a trailer 13. The trailer has a pair of wheel assemblies 14 and includes a source of pneumatic pressure constituting part of the pneumatic braking system, hereinafter identified, of the trailer. The bed has an upper surface 16 adapted to receive a plurality of bins 17 in stacked relation thereon containing the perishable goods, such as fresh fruits or vegetables, for transport by the truck. Each of the bins has a lower surface 18 and upper edges 19. In accordance with conventional practices, the bins are stacked to form a load with pallets 20 interposed therebetween.

Figure 2:
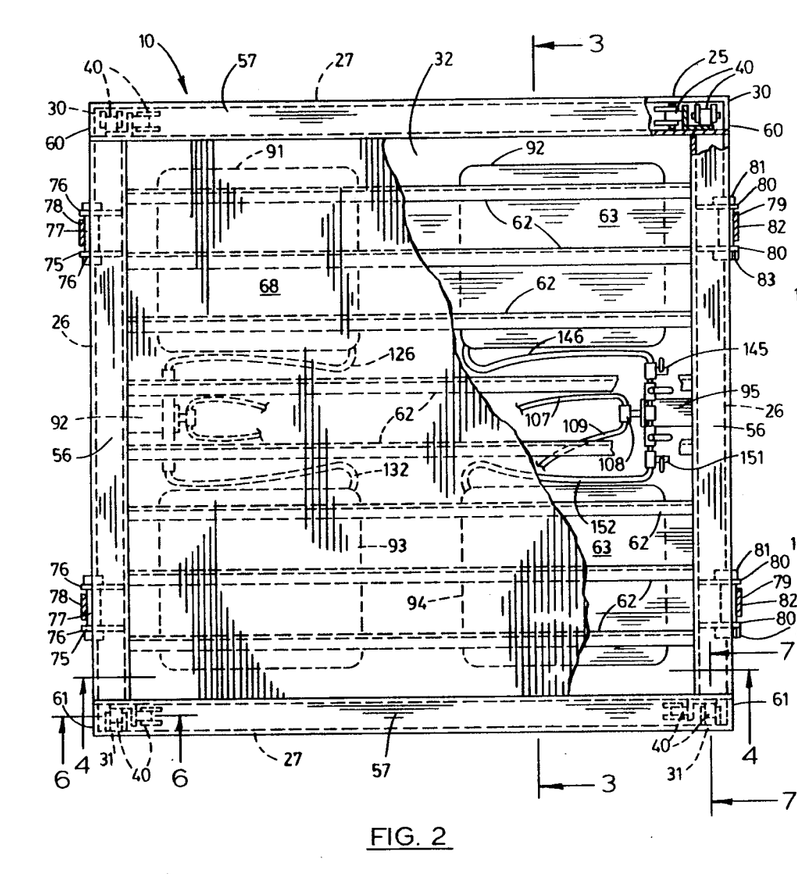
FIG. 2 is a somewhat enlarged, fragmentary horizontal section taken on line 2—2 in FIG. 1.

The apparatus 10 has a base frame 25 constructed of a pair of substantially parallel longitudinal angle iron beams 26 interconnected at the opposite ends thereof by a pair of transverse angle iron beams 27, as can best be seen in FIG. 2. Each of the angle iron beams 26 and 27 has horizontal portions 28 and vertical portions 29. Referring more particularly to FIG. 2, the longitudinal and transverse angle iron beams are interconnected, as by welding, to form forward corners 30 for the base frame and rearward corners 31. The base frame thus defines an interior area 32.

Figure 6:
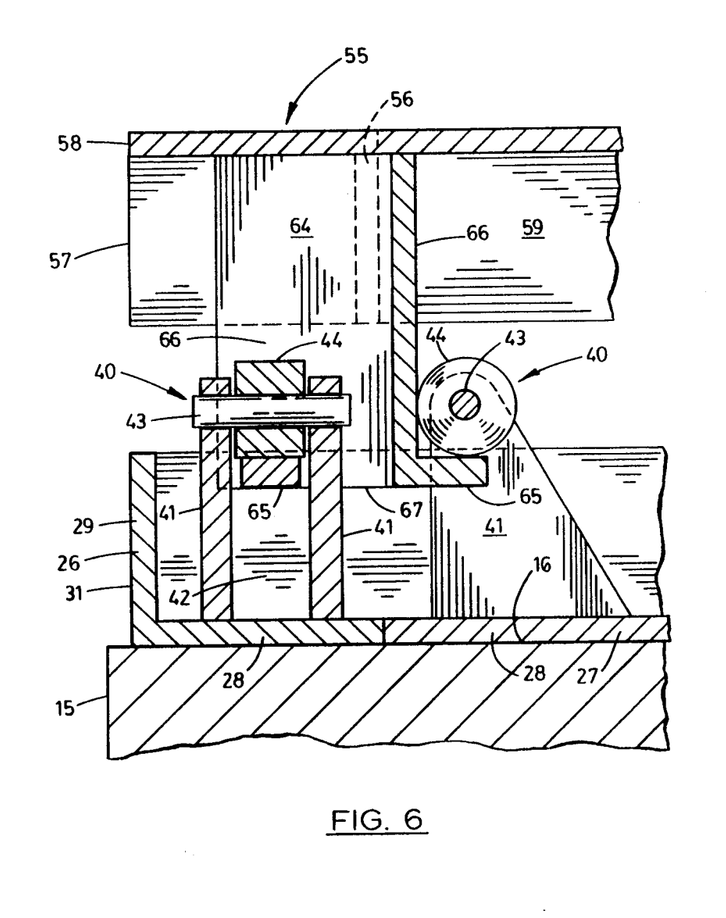
FIG. 6 is a somewhat enlarged, fragmentary transverse vertical section taken on line 6—6 in FIG. 2.
Figure 7:
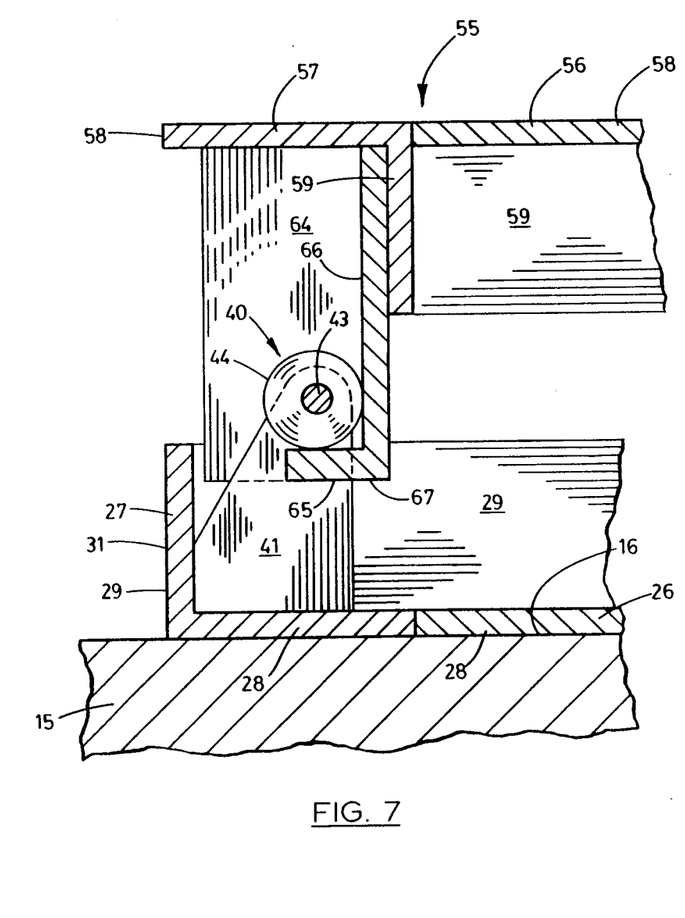
FIG. 7 is a somewhat enlarged, fragmentary longitudinal, vertical section taken on line 7—7 in FIG. 2.

The forward corners 30 and rearward corners 31 of the base frame 25 each mount a pair of control assemblies 40 best shown in FIGS. 2, 6 and 7. Referring more particularly to FIGS. 6 and 7, each control assembly has a pair of upright, substantially parallel mounting plates 41 mounted, as by welding on the horizontal portions 28 of the transverse angle iron beams 27. The mounting plates define a space 42 therebetween and are interconnected at their upwardly extending ends by a shaft 43 which extends substantially parallel to the horizontal portions 28 of the transverse angle iron beams 27. A guide assembly or roller 44 is mounted for rotational movement on each shaft 43. As can best be seen in FIG. 2, the control assemblies 40 of each corner of the base frame are disposed in closely spaced relation to each other with the longitudinal axes of the shafts disposed in right angular relation as can best be visualized in FIG. 2 in the forward corner 30 on the right as viewed therein.

Figure 3:
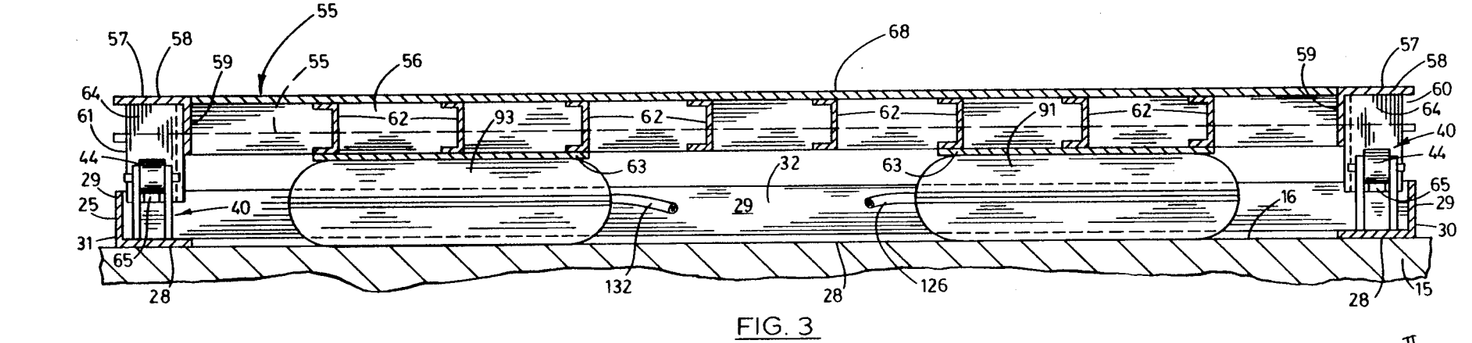
FIG. 3 is a somewhat further enlarged, fragmentary longitudinal vertical section taken from a position indicated by line 3—3 in FIG. 2.
Figure 4:
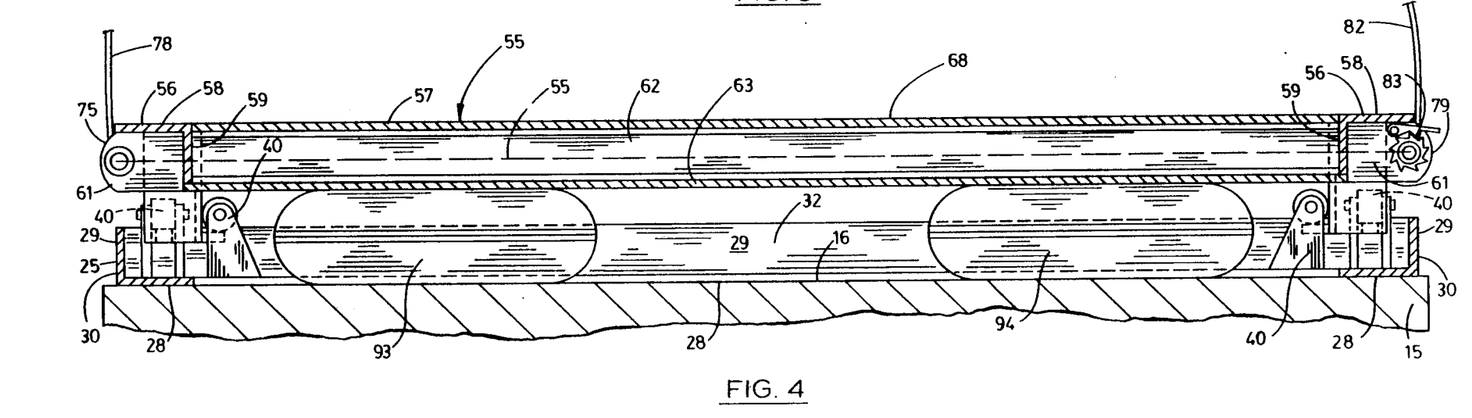
FIG. 4 is a somewhat further enlarged, fragmentary transverse vertical section taken from a position indicated by line 4—4 in FIG. 2.

A floating frame 55 is mounted on the base frame 25 in overlaying relation, as can best be seen in FIGS. 2, 3 and 4. Referring more particularly to FIG. 2, the floating frame has a pair of spaced substantially parallel longitudinal angle iron beams 56 interconnected at the opposite ends thereof by a pair of spaced substantially parallel transverse angle iron beams 57. The angle iron beams have horizontal portions 58 and downwardly extending vertical portions 59. The floating frame thus has forward corners 60 overlaying the forward corners 30 of the base frame and rearward corners 61 overlaying the rearward corners 31 of the base frame. The longitudinal angle iron beams 56 are interconnected by a plurality of spaced substantially parallel transverse beams 62. A pair of contact plates 63 are mounted on the undersides of the transverse beams 62 extending between the longitudinal angle iron beams 56 in spaced substantially parallel relation for purposes subsequently to be described. An angle iron corner plate 64 is mounted on each transverse angle iron beam 57 at each forward corner 60 and rearward corner 61 extending downwardly therefrom as shown best in FIGS. 6 and 7. A pair of roller contact plates 65 are mounted on each angle iron corner plate extending substantially right angles thereto individually into the space 42 beneath the roller 44 thereof so as to constitute a stop. Each of the angle iron corner plates has a guide surface 66 engageable by the roller 44 thereof and a terminal end 67. It will be understood that a certain amount of play is provided between the rollers and the guide surfaces 66 of the guide plates.

The floating frame 55 mounts a support plate 68 on the transverse beams thereof, as best shown in FIG. 3 and fragmentarily in FIG. 2. The floating frame mounts a pair of strap assemblies 75 on the longitudinal angle iron beam 56 on the left as viewed in FIG. 2. Each strap assembly includes a pair of mounting plates 76 secured, as by welding, on the vertical portion 59 of the longitudinal angle iron beam and extending outwardly therefrom in spaced substantially parallel relation. The mounting plates are interconnected by a reel assembly 77 on which is rolled a strap 78.

The longitudinal angle iron beam 56 on the right as viewed in FIG. 2 mounts a pair of straps securing assemblies 79 mounted thereon individually opposite the strap assemblies 75. Each strap securing assembly includes a pair of mounting plates 80 secured, as by welding on the horizontal portion 58 of the longitudinal angle iron beam extending outwardly therefrom in spaced substantially parallel relation. The mounting plates are interconnected by a reel assembly 81. The strap 78 of each strap assembly 75 can be extended over the bins, such as shown in FIG. 1, and its free end 82 wound around the reel assembly 81. A rachet and pawl assembly 83 is mounted on each strap securing assembly operable to permit tightening of the free end of the strap thereabout in the conventional fashion.

Figure 5:
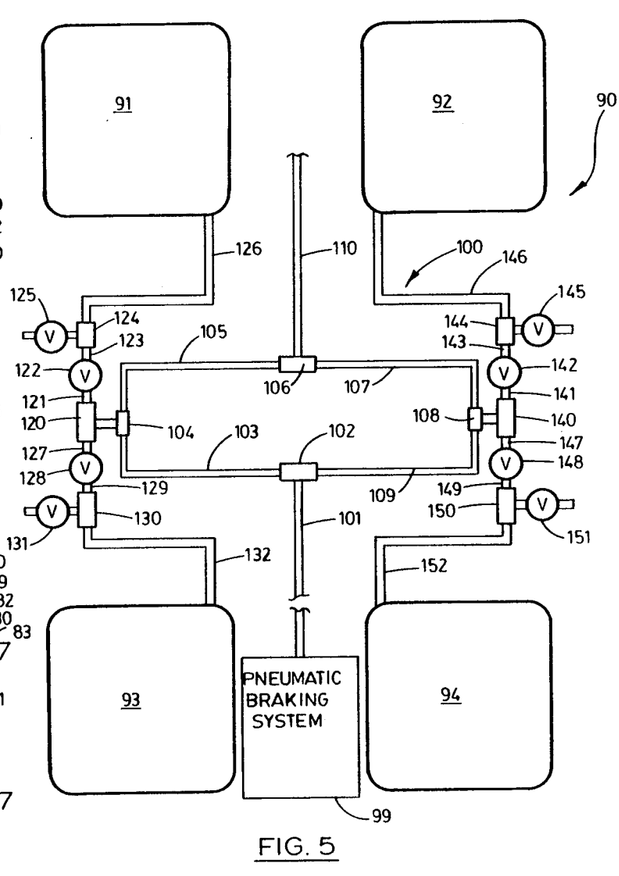
FIG. 5 is a schematic diagram of the pneumatic system and air bags of the present invention.

The apparatus 10 of the present invention has a cushioning system 90 shown schematically in FIG. 5. The cushioning system includes a forward left air bag 91, a forward right air bag 92, a rearward left air bag 93 and a rearward right air bag 94. The air bags, which are best shown in FIGS. 3 and 4, are constructed of resilient material and are air tight permitting them to be inflated to expand in vertical directions as can best be visualized in FIGS. 3 and 4. The air bags are positioned within the interior area 32 of the base frame spaced from each other as shown in FIGS. 3 and 4 with the forward pair of air bags positioned under the forward contact plate 63 and the rearward air bags positioned under the contact plate 63 on the left as viewed in FIG. 3. A mounting bracket 95 is mounted, as by welding on the interior side of the vertical portion 29 of the longitudinal angle iron beams 26 of the base frame 25.

The apparatus 10 has a pneumatic system 100 including a pneumatic conduit 101 connected, in the preferred embodiment of the invention, to the conventional pneumatic braking system, generally indicated at 99, of the trailer 13. The conduit 101 is connected to a fitting 102 which in turn is connected to a pneumatic conduit 103 terminating in a tee fitting 104 mounted on the mounting bracket 95 on the left as viewed in FIG. 2. A pneumatic conduit 105 extends from the tee fitting 104 to a fitting 106. A pneumatic conduit 107 extends from the fitting 106 to a tee fitting 108 mounted on the mounting bracket 95 on the right as viewed in FIG. 2. A pneumatic conduit 109 is mounted on the fitting 108 and is connected to the fitting 102. A pneumatic conduit 110 is connected from the fitting 106 and is connected at its terminal end to the pneumatic braking system 99 of the trailer thus completing the circuit.

A fitting 120 is mounted on the tee fitting 104 and has a nipple 121 mounted thereon which in turn mounts an air valve 122. A nipple 123 is mounted on the air valve 122 and has a fitting 124 at the opposite end thereof. A discharge valve 125 is mounted on the fitting 124. A pneumatic conduit 126 is connected to the fitting 124 and is connected at its opposite end to the forward left air bag 91.

A nipple 127 is mounted on the fitting 120 and, in turn, mounts an air valve 128. A nipple 129 is mounted on the air valve 128 and, in turn, mounts a fitting 130 thereon. A discharge valve 131 is mounted on the fitting 130. A pneumatic conduit 132 operably connects the fitting 130 and the rearward left air bag 93.

A fitting 140 is mounted on the tee fitting 108 mounted on the mounting bracket 95 on the right as viewed in FIG. 2. A nipple 141 is mounted on the fitting 140 and, in turn, mounts an air valve 142 at the end thereof. A nipple 143 is mounted on the air valve 142 and, in turn, mounts a fitting 144 at the end thereof. A discharge valve 145 is mounted on the fitting 144. A pneumatic conduit 146 interconnects the fitting 144 and the forward right air bag 92.

A nipple 147 is mounted on the fitting 140 and, in turn, mounts an air valve 148 on the opposite end thereof. A nipple 149 is mounted on the air valve 148 and, in turn, mounts a fitting 150 at the opposite end thereof. A discharge valve 151 is mounted on the fitting 150. A pneumatic conduit 152 interconnects the fitting 150 and the rearward right air bag 94.

OPERATION

The operation of the described embodiment of the subject invention is believed to be readily apparent and is briefly summarized at this point.

The apparatus 10 can be retrofitted on the bed of an existing trailer, truck, railroad car or the like by simply bolting the base frame 25 on the upper surface of the bed thereof. Thus, in the case of trailer 13, the base frame is mounted on the upper surface 16 of the bed 15 in a position such as shown in FIG. 1. While only one apparatus 10 is shown mounted on the trailer in FIG. 1, it will be understood that two or more such apparatuses can be mounted in adjacent positions for such usage.

When the apparatus 10 is to be loaded with, for example, bins 17 for transport, the bins are, of course, filled with the perishable goods such as fresh fruit in accordance with conventional practice. When the apparatus 10 is to be loaded with the bins, the pneumatic system 100 is depressurized so that the floating frame 55 is disposed in a first position shown in phantom lines in FIGS. 3 and 4 in which the terminal ends 67 of the roller contact plate 65 are rested on the horizontal portions 28 of the transverse angle iron beams 27. Thus, the floating frame is supported rigidly on the bed 15 of the trailer 13 during loading of the floating frame 55. Using forklifts, not shown, the bins 17 borne on the pallets 20 are disposed in stacked relation on the support plate 68 of the floating frame 55, as shown in FIG. 1. When this has been achieved, the straps 78 are extended over the upper edges 19 of the upper most bins 17, as shown in FIG. 1, and down on the opposite side of the trailer and the free ends 82 of the straps individually secured in the reel assemblies 81 in the conventional fashion.

The pneumatic system 100 is now operated to move the floating frame 55 from the first position shown in phantom lines at 55 in FIGS. 3 and 4 to the second position shown in full lines therein. This is achieved by opening the air valves 122, 128, 142 and 148 to permit air under pressure to pass from the pneumatic braking system 99 of the trailer along the pneumatic conduits 101, 103, 105, 107 and 109 and to the respective forward left air bag 91 through pneumatic conduit 126, the forward right air bag 92 through the pneumatic conduit 146, to the rearward left air bag 93 through the pneumatic conduit 132 and to the rearward right air bag 94 through the pneumatic conduit 152. The elasticity of the air bags is such as to permit them to be inflated to move the floating frame to the second position shown in full lines in FIGS. 3 and 4 so that the entire load borne by the support plate 68 of the floating frame 55 is elevated to a cushioned, suspended position shown in FIG. 1.

When so supported, during transport of the perishable goods contained in the bins 17, the movement and shock associated with movement along roadways is absorbed by the air bags 91, 92, 93 and 94 and thereby not transferred to the perishable goods. It has been discovered that transport in such a fashion substantially reduces the bruising, marring, and other damage to perishable goods experienced in the practice of conventional methods for transporting such goods. The floating frame 55 is, in effect, allowed to float in a suspended state on the air bags retained by the control assemblies 40 in vertical alignment over the trailer bed while being free to move short distances both vertically and horizontally to absorb the motion and shock applied thereto.

By discriminate operation of the air valves 122, 128, 142 and 148, the operator can selectively adjust the degrees of inflation among the four air bags 91, 92, 93 and 94 so as to accommodate uneven distributions of weight contained in the bins 17 supported on the support plate 68. Such adjustment can also be achieved by releasing air from the air bags through discharge valves 125, 131, 145 and 151.

Therefore, the method and apparatus of the present invention are operable to transport work objects, such as fresh fruits and vegetables, by truck, trailer, ocean going vessel and the like employing inflatable mechanisms to isolate the work objects from the motion and shock incident to such transport, operable dependably and securely by personnel to achieve the desired result, and minimizing the risk of equipment failure, damage to the work objects and injury to personnel all in such a manner as to insure that the losses characterized by conventional transporting procedures due to such damage are dependably and consistently maintained at a minimum.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for transporting a work object comprising a frame adapted to be mounted on a means of conveyance having a supporting surface, a platform for receiving sad work object in rested relation thereon disposed in overlaying relation to said supporting surface of the means of conveyance, an inflatable reservoir disposed between said supporting surface and the platform, at least two spaced corresponding portions of said platform and frame individually linked by guide plates individually extending substantially vertically between the platform and the frame to define a path of movement for said platform toward and from the frame, rotational guide assemblies individually engageable with said guide plates for guiding movement of the platform in said path, and means for selectivity inflating said reservoir to move the platform and thus the work object borne thereby from the frame to a suspended position cushioned against damage during transport by said means of conveyance.

2. The apparatus of claim 1 wherein said means of conveyance is a vehicle, the supporting surface is a substantially horizontal bed of said vehicle and said frame is adapted to be mounted on said bed with the platform disposed thereabove.

3. The apparatus of claim 2 wherein said platform and frame are so interconnected by the guide plates and guide assemblies to define a range of movement of the platform toward and from the frame.

4. The apparatus of claim 2 wherein said platform and frame are so interconnected that the platform is movable from a first position, wherein the platform and bed of the vehicle are spaced from each other to define a chamber therebetween, to a second position, wherein the platform is spaced farther above said bed of the vehicle substantially insulated from motion potentially damaging to said work object.

5. The apparatus of claim 4 wherein said reservoir is an air bag disposed in said chamber between the platform and the bed of the vehicle and is inflatable by the inflating means to move the platform between the first and second positions.

6. The apparatus of claim 5 wherein said platform and frame are interconnected by the guide plates and guide assemblies so as to limit movement of the platform to a range of vertical movement limited to the coextensive with said first and second positions and to a range of horizontal movement permitting sufficient play in movement of the platform between the first and second positions to absorb motion potentially damaging to said work object.

7. An apparatus for transporting a work object comprising a frame of a rectangular configuration having four corners adapted to be mounted on a substantially horizontal bed of a vehicle; a platform of a rectangular configuration substantially conforming to said rectangular configuration of the frame and having four corners individually substantially overlaying the four corners of the frame for receiving said work object in rested relation thereon disposed in overlaying relation to said bed of the vehicle, said platform being movable from a first position, wherein the platform and bed of the vehicle are spaced from each other to define a chamber therebetween, to a second position, wherein the platform is spaced farther above the bed of the vehicle than in said first position; an air bag disposed in the chamber between the platform and the bed of the vehicle; means for selectively inflating the air bag to move the platform, and thus the work object borne thereby, between the first and second positions cushioned against damage during transport by said vehicle in said second position; and at least two corresponding corners of the frame and platform individually linked by guide plates individually extending substantially vertically between the platform and frame to define a path of movement of said platform between said first and second positions and rollers individually engageable with said guide plates to guide movement therealong.

8. The apparatus of claim 7 wherein each of said guide plates is substantially right angular in cross section to provide a pair of guide surfaces and rollers are individually engageable with said guide surfaces of each guide plate to limit lateral movement of the platform in said path of movement between said first and second positions.

9. The apparatus of claim 8 wherein a stop is mounted on each guide surface of each guide plate extending beneath the respective roller thereof for engagement therewith substantially upon said platform reaching the second position to terminate movement beyond said second position.

10. The apparatus of claim 9 wherein each guide plate has a terminal end disposed for rested engagement with the frame substantially upon the platform reaching the first position to terminate movement beyond the said first position thereby to define said chamber between the platform and the bed of the vehicle.

11. The apparatus of claim 7 wherein there are four air bags disposed in said chamber individually adjacent to the four corners of the frame and platform and said inflating means includes a pneumatic system connected to a source of pneumatic pressure and individually to said air bags through individually operable valves whereby the air bags can be inflated to individual amounts of inflation to adjust the attitude of said platform in said second position and thereby the work object borne thereby.

12. The apparatus of claim 11 wherein said pneumatic system has four air release valves individual to the four air bags and individually operable to release air pressure from the air bags to return said platform to the first position in the desired attitude and thus the work object borne thereby.

13. The apparatus of claim 12 wherein the vehicle has a pneumatic brake system and said source of pneumatic pressure of the apparatus is said pneumatic brake system.

* * * * *

UNITED STATES PATENT AND TRADEMARK OFFICE
CERTIFICATE OF CORRECTION

PATENT NO. : 5,120,184
DATED : June 9, 1992
INVENTOR(S) : Daniel J. Gerawan

It is certified that error appears in the above-indentified patent and that said Letters Patent is hereby corrected as shown below:

Title page, Inventor's address, delete "Engelhart" and insert --- Englehart ---;

Column 2, Line 3, insert ---.--- after "transport";

Column 7, Line 59, delete "sad" and insert --- said ---;

Column 8, Line 32, delete "the" and insert --- that ---.

Signed and Sealed this

Thirteenth Day of July, 1993

Attest:

MICHAEL K. KIRK

*Attesting Officer*    Acting Commissioner of Patents and Trademarks